(12) United States Patent
Lissianski et al.

(10) Patent No.: US 6,280,695 B1
(45) Date of Patent: Aug. 28, 2001

(54) METHOD OF REDUCING NO$_X$ IN A COMBUSTION FLUE GAS

(75) Inventors: Vitali V. Lissianski, San Juan Capistrano; Vladimir M. Zamansky, San Clemente, both of CA (US); Richard K. Lyon, Pittstown, NJ (US); Roy Payne, Mission Viejo, CA (US)

(73) Assignee: GE Energy & Environmental Research Corp., Mason, CA (US)

( * ) Notice: Subject to any disclaimer, the term of this patent is extended or adjusted under 35 U.S.C. 154(b) by 0 days.

(21) Appl. No.: 09/612,753

(22) Filed: Jul. 10, 2000

(51) Int. Cl.$^7$ .............................. B01J 8/00; C01B 21/00; F23J 15/02

(52) U.S. Cl. ...................... 423/239.1; 110/203; 110/210; 110/215; 110/345

(58) Field of Search ................................. 423/235, 239.1; 110/203, 210, 215, 345

(56) References Cited

U.S. PATENT DOCUMENTS

| | | | |
|---|---|---|---|
| 3,900,554 | 8/1975 | Lyon | 423/235 |
| 4,208,386 | 6/1980 | Arand et al. | 423/235 |
| 4,325,924 | 4/1982 | Arand et al. | 423/235 |
| 4,335,084 | 6/1982 | Brogan | 423/235 |
| 4,403,941 | 9/1983 | Okiura et al. | 431/10 |
| 4,719,092 | 1/1988 | Bowers | 423/235 |
| 4,751,065 | 6/1988 | Bowers | 423/235 |
| 4,770,863 | 9/1988 | Epperly et al. | 423/235 |
| 4,777,024 | 10/1988 | Epperly et al. | 423/235 |
| 4,780,289 | 10/1988 | Epperly et al. | 423/235 |
| 4,803,059 | 2/1989 | Sullivan et al. | 423/235 |
| 4,842,834 | 6/1989 | Burton | 423/235 |
| 4,844,878 | 7/1989 | Epperly et al. | 423/235 |
| 4,851,201 | 7/1989 | Heap et al. | 423/235 |

(List continued on next page.)

OTHER PUBLICATIONS

"Proceedings of the NO$_x$ Control Technology Seminar," EPRI SR–39 Special Report (Feb. 1976).

"Effective Mixing Processes For SO$_x$ Sorbent and Coal Combustion Products," U.S. Environmental Protectoin Agency, Report No. EPA/600/7–87–013, 1987.

"Fundamental Combustion Research Applied to Pollution Formation," U.S. Environmental Protection Agency, Report No. EPA/600/7–87–027, vol. 4: Engineering Analysis (1987).

Peter Glarborg, Maria U. Alzueta, and Kim Dam–Johansen, "Kinetic Modeling of Hydrocarbon/Nitric Oxide Interactions in a Flow Reactor," Combustion and Flame 115:1–27 (1998).

"Thermal Process Knocks NO$_x$," New Products & Services, Chemical Engineering, pp. 85–86, Jun. 19, 1978.

Hsieh, B.C., et al., "An Analysis of Chemistry and Mechanisms for High Temperature Desulfurization of Low BTU Gas When Using Lime or Limestone," Gilbert Associates, Inc., 1974 (no month).

(List continued on next page.)

Primary Examiner—Wayne Langel
Assistant Examiner—Maribel Medina
(74) Attorney, Agent, or Firm—Workman, Nydegger & Seeley

(57) ABSTRACT

Methods are provided for decreasing the amount of nitrogen oxides released to the atmosphere as a component of combustion emissions. The methods are carried out by forming a combustion flue gas in a combustion zone, the combustion flue gas including nitrogen oxides, injecting overfire air and droplets of a solution or a powder of a selective reducing agent into a burnout zone, and contacting the combustion flue gas with the overfire air and the selective reducing agent in the burnout zone to thereby decrease the concentration of nitrogen oxides therein. The selective reducing agent is provided in an aqueous solution or powder which is injected into the overfire air in optimized droplet or particle form prior to or concurrently with injection of the overfire air into the burnout zone.

35 Claims, 7 Drawing Sheets

U.S. PATENT DOCUMENTS

| | | | |
|---|---|---|---|
| 4,861,567 | 8/1989 | Heap et al. | 423/235 |
| 4,863,704 | 9/1989 | Epperly et al. | 423/235 |
| 4,863,705 | 9/1989 | Epperly et al. | 423/235 |
| 4,877,590 | 10/1989 | Epperly et al. | 423/235 |
| 4,888,165 | 12/1989 | Epperly et al. | 423/235 |
| 4,902,488 | 2/1990 | Epperly et al. | 423/235 |
| 4,915,036 | 4/1990 | DeVita | 110/215 |
| 4,927,612 | 5/1990 | Bowers | 423/235 |
| 4,985,218 | 1/1991 | DeVita | 423/235 |
| 4,992,249 | 2/1991 | Bowers | 423/235 |
| 5,017,347 | 5/1991 | Epperly et al. | 423/235 |
| 5,057,293 | 10/1991 | Epperly et al. | 423/235 |
| 5,116,584 | 5/1992 | Chen et al. | 423/235 |
| 5,139,755 | 8/1992 | Seeker et al. | 423/235 |
| 5,224,334 | 7/1993 | Bell | 60/274 |
| 5,229,090 | 7/1993 | Hofmann et al. | 423/235 |
| 5,270,025 | 12/1993 | Ho et al. | 423/235 |
| 5,342,592 | 8/1994 | Peter-Hoblyn et al. | 423/235 |
| 5,443,805 | 8/1995 | Beer et al. | 423/235 |
| 5,453,257 | 9/1995 | Diep et al. | 423/235 |
| 5,478,542 | 12/1995 | Chawla et al. | 423/235 |
| 5,489,419 | 2/1996 | Diep et al. | 423/235 |
| 5,489,420 | 2/1996 | Diep | 423/235 |
| 5,536,482 | 7/1996 | Diep et al. | 423/235 |
| 5,728,357 | 3/1998 | von Harpe | 423/239.1 |
| 5,756,059 | 5/1998 | Zamansky et al. | 423/239.1 |
| 6,030,204 * | 2/2000 | Breen | 431/4 |

OTHER PUBLICATIONS

Richard K. Lyon and James E. Hardy, "Discovery and Development of the Thermal DeNO$_x$ Process," Process. Ind. Eng. Chem. Fundam, vol. 25, No. 1, pp. 19–24 (1986) (no month).

S. L. Chen, R. K. Lyon and W. R. Seeker, "Advanced Non–Catalytic Post Combustion NO$_x$ Control," Environmental Progress, vol. 10, No. 3, pp. 182–185, Aug., 1991.

Gullett, et al., Furnace Slurry Injection for Simultaneous SO$_2$/NO$_2$Removal, The 1991 SO$_2$Control Symposium, vol. 2: Sessions 5A–6B, pp. 87–103 (Dec. 1991).

James A. Miller and Craig T. Bowman, Mechanism and Modeling of Nitrogen Chemistry in Combustion Prog. Energy Combust. Sci., vol. 15, pp. 287–338 (1989) (no month).

Eckhart, et al., "Cyclone Reburn using Coal–Water Fuel," Report DOE/PC/90157–1, sponsored by U.S. Department of Energy and Pittsburgh Energy Technology Center (Oct. 1991).

* cited by examiner

US 6,280,695 B1

METHOD OF REDUCING $NO_x$ IN A COMBUSTION FLUE GAS

BACKGROUND OF THE INVENTION

1. Field of the Invention

The present invention is related to processes for reducing nitrogen oxide emissions in combustion systems. More specifically, the present invention provides methods of decreasing the concentration of nitrogen oxides in flue gases emitted to the atmosphere from stationary combustion systems such as boilers, furnaces and incinerators, by selective reduction of nitrogen oxides to molecular nitrogen.

2. Relevant Technology

One of the major problems in modern industrial society is the production of air pollution by a variety of combustion systems, such as boilers, furnaces, engines, incinerators and other combustion sources. One of the oldest recognized air pollution problems is the emission of smoke. In modern boilers and furnaces, emissions of smoke are eliminated or at least greatly reduced by the use of overfire air, or "OFA" technology. In this technology, most of the combustion air goes into the combustion chamber with the fuel, but a portion of the combustion air is added to the flue gases as they come out of the flame, to facilitate combustion of smoke particles and smoke particle precursors.

Other types of air pollutants produced by combustion include particulate emissions, such as fine particles of ash from pulverized coal firing. Still other pollutants are gas-phase (non-particulate) species, such as oxides of sulfur (principally $SO_2$ and $SO_3$), carbon monoxide, volatile hydrocarbons, and oxides of nitrogen, mainly NO and $NO_2$. Both NO and $NO_2$ are commonly referred to as "$NO_x$" because they interconvert, the NO initially formed at higher temperature being readily converted to $NO_2$ at lower temperatures. These nitrogen oxides are the subject of growing concern because of their toxicity and their role as precursors in acid rain and photochemical smog processes. $NO_x$ is emitted by a variety of sources, including mobile sources (such as automobiles, trucks and other mobile systems powered by internal combustion engines), stationary internal combustion engines, and other combustion sources, such as power plant boilers, industrial process furnaces, waste incinerators and the like.

Three principal technologies have been developed and successfully used to control the $NO_x$ emissions from combustion sources such as boilers and furnaces.

The least expensive of the three principal types of $NO_x$ control technologies is combustion modification, i.e., technologies which modify the combustion process so that it produces less $NO_x$. One example of $NO_x$ control by combustion modification is installation of low $NO_x$ Burners ("LNB") that use fuel and air staging inside the burner. Another example of $NO_x$ control by combustion modification is a technology commonly referred to as "reburning." In the basic reburning process, a fraction of the fuel, typically between 10 and 20% of the total heat input, is injected above the main heat release zone to produce an oxygen deficient reburning zone. Hydrocarbon radicals formed from combustion of the reburning fuel react with $NO_x$, reducing it partially to molecular nitrogen and partially to $NH_3$ and HCN. Subsequently, overfire air is added in an amount sufficient to burn out the remaining fuel and to oxidize the $NH_3$ and HCN in part to molecular nitrogen and in part to $NO_x$. Because of their low capital and operating costs, combustion modification technologies are usually the technologies first employed when control of $NO_x$ emissions is found to be necessary. However, the extent of $NO_x$ reduction which these technologies provide is limited to about 30–50% for LNB and about 50–60% for reburning.

A more effective alternative to combustion modification is selective catalytic reduction ("SCR"). Currently, SCR is the commercial technology with the highest $NO_x$ control efficiency. In SCR, $NO_x$ is reduced with a nitrogenous reducing agent ("N-agent"), such as ammonia or urea, on the surface of a catalyst. The SCR systems are typically positioned at a temperature of about 700° F. in the exhaust stream. Although SCR can relatively easily achieve 80% $NO_x$ reduction, it is far from an ideal solution for $NO_x$ control. The size of the catalyst bed required to achieve effective $NO_x$ reduction is quite large, and use of this large catalyst, with its related installation and system modification requirements, is expensive to implement. In addition, catalyst deactivation, due to a number of mechanisms, typically limits catalyst life to about four years for coal-fired applications. The spent catalysts are toxic and pose disposal problems.

A third group of $NO_x$ reduction technologies are the Selective Non-Catalytic Reduction ("SNCR") technologies. These technologies, which are somewhat more expensive than combustion modification but which provide additional $NO_x$ control at a lower cost than SCR, involve the injection of a nitrogenous reducing agent ("N-agent"), such as ammonia or urea, into the flue gas at high temperature and under conditions such that a noncatalytic reaction selectively reduces the $NO_x$ to molecular nitrogen. Reduction of the $NO_x$ is considered to be selective because the flue gas being treated contains substantial amounts of molecular oxygen, most of which is not reduced, while the $NO_x$ is reduced.

The first example of $NO_x$ control by an SNCR process was the "Thermal $DeNO_x$" process in which $NH_3$ was used for the selective non-catalytic reduction of $NO_x$ at a temperature of 1600° F. to 2000° F. The Thermal $DeNO_x$ process is described in detail in U.S. Pat. No. 3,900,554; to Lyon et al., and in Lyon and Hardy, "Discovery and Development of the Thermal $DeNO_x$ Process," *Ind. Eng. Chem. Fundam.*, 25, 19–24 (1986). Other references, such as U.S. Pat. No. 4,208,386 to Arand et al., and Muzio et. al., *Proceedings of the $NO_x$ Control Technology Seminar,* EPRI SR-39 Special Report, (February 1976) disclose $NO_x$ reduction by SNCR using urea. In these references, urea or an aqueous urea solution is injected into the hot $NO_x$-containing flue gases.

The advanced reburning (AR) process, which is an integration of basic reburning and SNCR, is disclosed in U.S. Pat. No. 5,139,755 to Seeker et al. In the AR process, the N-agent is injected into a downstream burnout zone, and the reburning system is adjusted to optimize the $NO_x$ reduction due to the N-agent. By adjusting the reburning fuel injection rate to achieve near stoichiometric conditions in the AR process, instead of the fuel rich conditions normally used for reburning, the CO level is controlled and the temperature window is broadened.

Further enhancements of the AR process are disclosed in U.S. Pat. No. 5,756,059 to Zamansky et al., which describes injection of a reducing agent into the reburning zone and the use of promoters, which enhance $NO_x$ control. The promoters are metal-containing compounds that can be added to the reducing agents, and either one or two stages of reducing agent injection can be employed.

It is well known to those skilled in the art that the range of temperatures in which it is possible to reduce $NO_x$ via conventional SNCR methods is narrow (about 1600–2000° F.). Consequently, the teachings of the prior art that droplets of the selective reducing agent must be directly injected into the hot flue gas means that the injection system must be located in a high temperature section of the boiler, furnace, or other combustion system. In some cases, however, the region of the combustion system in which the injection system must be located is inaccessible, making the use of urea injection for $NO_x$ control impracticable. In other cases, although it is possible to install a system of injectors, installation can be done only when the combustion system is shut down and cooled to ambient temperature. Shutting down a power plant boiler means losing the valuable electricity it would otherwise produce. Similarly, shutting down an industrial furnace can idle the manufacturing facilities which depend on the heat it produces. In general, large combustors are designed for continuous or near continuous operation, making downtime expensive.

Installation of SNCR injectors, even without system shut down, is expensive and responsible for a significant portion of capital costs. Although OFA injectors are available in many combustors, they are not designed for liquid injection and are located at higher temperatures where the SNCR process is ineffective.

Thus, there is a need for a method of using SNCR in boilers and furnaces in which it is mechanically difficult or impossible to install an injector system at the location in the boiler or furnace where the flue gas temperature is appropriate for conventional SNCR $NO_x$ reduction. There is a further need for a method of using SNCR that does not require the expense and downtime of installing an injection system in a high temperature region of the boiler, furnace or other combustion system.

SUMMARY AND OBJECTS OF THE INVENTION

It is an object of the present invention to provide methods for decreasing the concentration of $NO_x$ in combustion flue gases before the gases are emitted to the atmosphere.

It is another object of the present invention to provide methods of decreasing the concentration of $NO_x$ in combustion flue gases without the necessity of locating an SNCR injection system at the location in the boiler or furnace corresponding to the appropriate temperature for SNCR $NO_x$ reduction.

It is a further object of the present invention to provide methods of contacting droplets of an N-agent solution or an N-agent powder with $NO_x$ containing flue gas at the temperature appropriate for SNCR $NO_x$ reduction without the expense and downtime of installing an injection system in a high temperature region of the boiler, furnace or other combustion system.

To achieve the foregoing objects, and in accordance with the invention as embodied and broadly described herein, methods and apparatuses have been developed based on a surprising discovery. An often-repeated teaching of the prior art is that the mixing of the selective reducing agent with the $NO_x$-containing flue gas must be rapid. It is the altogether surprising discovery of the present invention that $NO_x$ in high temperature flue gas can be effectively reduced without directly injecting droplets of a selective reducing agent into the high temperature $NO_x$-containing flue gas. Instead, it has been discovered that an effective reduction of $NO_x$ can be achieved by injecting droplets of a solution or powdered particles of a selective reducing agent into the overfire air. Advantageously, this injection can be done before the overfire air goes into the combustion system, allowing the injection system to be located in a conveniently accessible region of the combustion system, and avoiding the need for expensive downtime. The injection may be also done by modification of OFA injectors, reducing capital costs that would be required for installation of separate SNCR injectors.

In one method according to the present invention, the concentration of nitrogen oxides in a combustion flue gas is decreased by forming a combustion flue gas in a combustion zone, the combustion flue gas including nitrogen oxides, providing overfire air and droplets of a solution of a selective reducing agent in a burnout zone, and contacting the combustion flue gas with the overfire air and the selective reducing agent in the burnout zone to thereby decrease the concentration of nitrogen oxides therein. The selective reducing agent can be conveniently injected into the overfire air before the overfire air is injected into the burnout zone, or concurrently with overfire air injection.

In another method of the present invention, the concentration of nitrogen oxides in a combustion flue gas is decreased by forming a combustion flue gas in a combustion zone, the combustion flue gas including nitrogen oxides; forming a mixture of overfire air and droplets of an aqueous solution of a selective reducing agent such as urea, ammonia, or an ammonium salt of an organic or inorganic acid; introducing the mixture into a burnout zone; and contacting the combustion flue gas with the overfire air and the selective reducing agent in the burnout zone to thereby decrease the concentration of nitrogen oxides therein.

Methods of the present invention can also utilize a selective reducing agent in the form of a powder. Examples of such reducing agent powders are urea, cyanuric acid, ammonium sulfate, ammonium carbonate, or ammonium salts of organic or other inorganic acids.

These and other features of the present invention will become more fully apparent from the following description and appended claims, or may be learned by the practice of the invention as set forth hereinafter.

BRIEF DESCRIPTION OF THE DRAWINGS

In order to illustrate the manner in which the above-recited and other advantages and objects of the invention are obtained, a more particular description of the invention briefly described above will be rendered by reference to a specific embodiment thereof which is illustrated in the appended drawings. Understanding that these drawings depict only a typical embodiment of the invention and are not, therefore, to be considered limiting of its scope, the invention will be described and explained with additional specificity and detail through the use of the accompanying drawings in which.

DETAILED DESCRIPTION OF THE INVENTION

The present invention is directed to methods and systems for reducing $NO_x$ emissions from combustion systems by contacting a selective reducing agent with the combustion flue gas without the need to inject the selective reducing agent directly into the flue gas. The invention represents an improvement over prior techniques in that the present methods and systems reduce $NO_x$ in the flue gas of a combustion system without the need for locating an SNCR injector in a high temperature region of the combustion system. In general, the present invention surprisingly achieves these improvements by combining droplets of a solution or a powder of a selective reducing agent with the overfire air instead of directly injecting the selective reducing agents into the hot flue gas.

As used herein, the terms "nitrogen oxides" and "$NO_x$" are used interchangeably to refer to the chemical species nitric oxide (NO) and nitrogen dioxide ($NO_2$). Other oxides of nitrogen are known, such as $N_2O$, $N_2O_3$, $N_2O_4$ and $N_2O_5$, but these species are not emitted in significant quantities from stationary combustion sources (except $N_2O$ in some systems). Thus, while the term "nitrogen oxides" can be used more generally to encompass all binary N—O compounds, it is used herein to refer particularly to the NO and $NO_2$ (i.e., $NO_x$) species.

In one method according to the present invention, the concentration of nitrogen oxides in a combustion flue gas is decreased by forming a combustion flue gas in a combustion zone, the combustion flue gas including nitrogen oxides, providing overfire air and droplets of a solution or a powder of a selective reducing agent in a burnout zone, and contacting the combustion flue gas with the overfire air and the selective reducing agent in the burnout zone to thereby decrease the concentration of nitrogen oxides therein.

The combustion flue gas is formed by conventional processes well known in the art, by burning conventional fuels in any of a variety of conventional combustion systems. Similarly, the burnout zone is formed by injecting overfire air in a region of the combustion system "downstream", i.e., in the direction of combustion flue gas flow, from the combustion zone. It is a particular feature of the present invention that the methods described herein can be carried out using a wide variety of conventional combustion devices adapted as described in more detail below. Thus, any combustion device that includes a combustion zone for oxidizing a combustible fuel and a burnout zone can be used. For example, the combustion and burnout zones may be provided in a power plant, boiler, furnace, magnetohydrodynamic (MHD) combustor, incinerator, engine, or other combustion device. Combinations of such combustion devices are also suitable for use with the present invention.

Figure 1A:
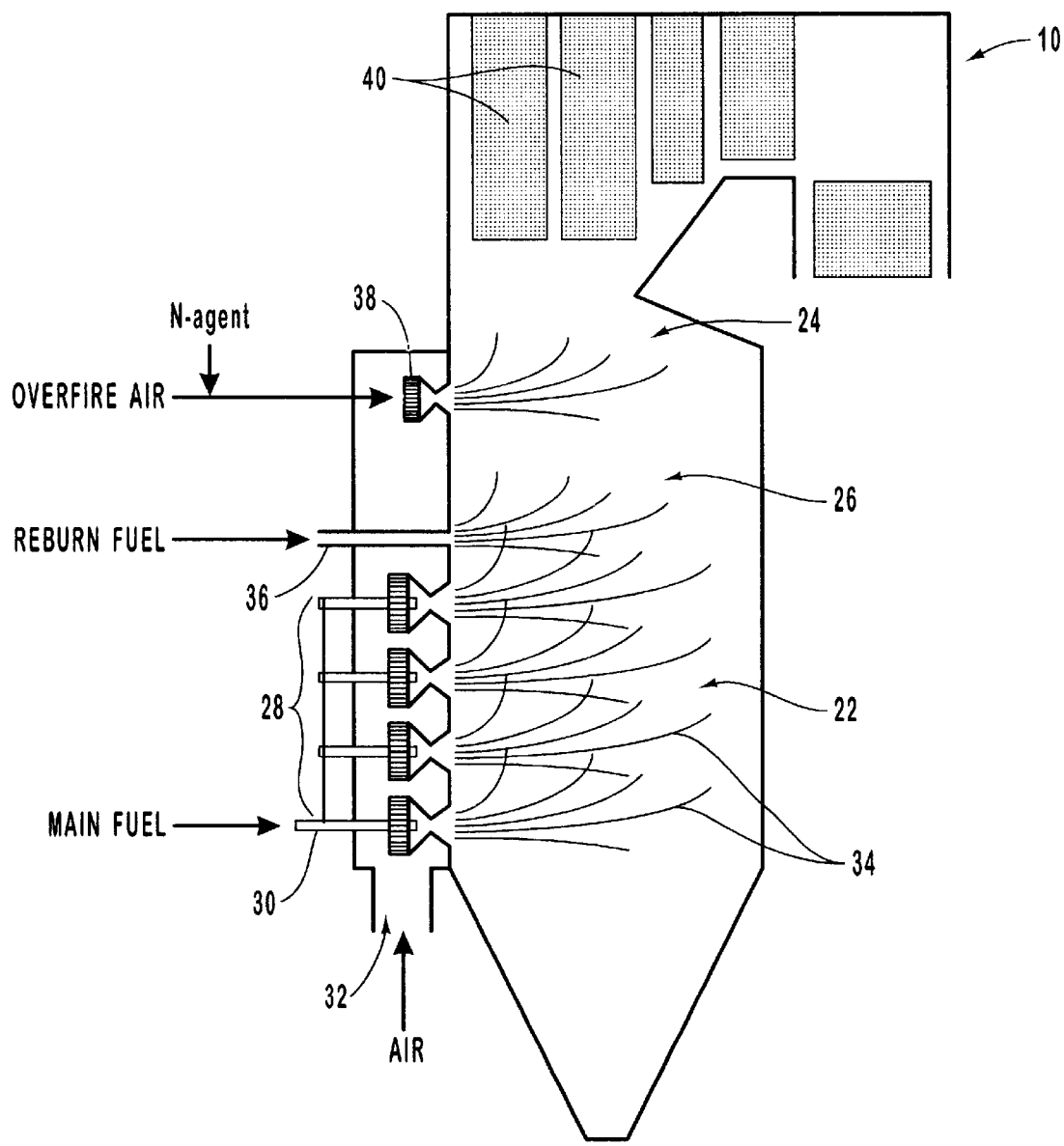
FIG. 1A is a schematic representation of a coal-fired combustion device adapted for using a method of the present invention.

Referring now to FIG. 1, a schematic representation of a combustion system 10 such as used in a coal-fired boiler or furnace and adapted for the methods of the present invention is shown. The combustion system 10 includes a combustion zone 22 and a burnout zone 24. The combustion system 10 also includes a reburning zone 26, which is optional but preferred. The combustion zone 22 is equipped with at least one, and preferably a plurality, of main burners 28 which are supplied with a main fuel such as coal through a fuel input 30 and with air through an air input 32. The main fuel is burned in combustion zone 22 to form a combustion flue gas 34 that flows from combustion zone 22 toward burnout zone 24, a direction referred to herein as a "downstream" direction. When the optional reburning zone 26 is used, typically about 85%–95% of the total heat input is supplied through main burners 28, and the remaining 5%–15% of heat is supplied by injecting a reburn fuel such as natural gas through a reburn fuel input 36. Downstream of reburning zone 26, overfire air is injected through an overfire air input 38 into burnout zone 24. The combustion flue gas 34 passes through a series of heat exchangers 40, and any solid particles are removed by a particulate control device (not shown), such as an electrostatic precipitator ("ESP") or baghouse.

A selective reducing agent (N-agent) is added to the overfire air prior to or concurrently with injection of the overfire air into burnout zone 24. As used herein, the terms "selective reducing agent" and "N-agent" are used interchangeably to refer to any of a variety of chemical species capable of selectively reducing $NO_x$ in the presence of oxygen in a combustion system. In general, suitable selective reducing agents include urea, ammonia, cyanuric acid, hydrazine, thanolamine, biuret, triuret, ammelide, ammonium salts of organic acids, ammonium salts of inorganic acids, and the like. Specific examples of ammonium salt reducing agents include, ammonium sulfate, ammonium bisulfate, ammonium bisulfite, ammonium formate, ammonium carbonate, ammonium bicarbonate, ammonium nitrate, and the like. Mixtures of these selective reducing agents can also be used. The selective reducing agent is provided in a solution, preferably an aqueous solution, or in the form of a powder. One preferred selective reducing agent is urea in aqueous solution.

The stoichiometric ratio of the amount of selective reducing agent in the overfire air to the amount of $NO_x$ in the flue gas being treated is about 0.4 to about 10, and preferably about 0.7 to about 3. The stoichiometric ratio is defined herein as the ratio of number of moles of nitrogen atoms in the selective reducing agent to number of moles of nitrogen atoms in the $NO_x$.

In a preferred method, the selective reducing agent is provided in an aqueous solution that is injected into the overfire air in optimized droplet form, either before injection of the overfire air into the reburn zone, concurrently with injection of the overfire air into the reburn zone, or both. The aqueous solution can contain the selective reducing agent in any suitable concentration, such as from about 5% to about 90% by weight, and preferably from about 5% to about 50% by weight. For example, a preferred concentration range for urea is about 5% to about 20% by weight.

The selective reducing agent can also be provided in a powder that is injected into overfire air in optimized particle form in a fashion as described above. The optimized particle form can be provided by passing the powder through a screen to give a narrow size distribution of particles prior to injection of the powder.

The droplets of reducing agent solution are protected by a "shield" stream of relatively colder OFA. If the droplets are big enough, they are transferred by the stream of OFA mixing with flue gas to a lower temperature SNCR zone. Injection of the reducing agent such as urea into the OFA results in a higher level of NO reduction than in conventional reburning, with the added benefit of not requiring installation of SNCR injectors in the combustion system.

Aqueous solutions of the selective reducing agent can be injected into the overfire air using conventional injection systems commonly used to generate droplets. Such injection systems are well known in the art. For example, the N-agents can be injected by gas-liquid injectors such as various atomizers. Suitable atomizers include dual-fluid atomizers, which use air or steam as the atomizing medium, as well as suitably designed pressure atomizers. Those skilled in the art are aware of suitable design techniques for each of these types of atomizers to generate sprays with droplets in the appropriate size ranges. One or more injectors may be utilized to inject the droplets into the overfire air.

The selective reducing agent in a powder form can be injected into the overfire air using conventional injection systems commonly used to inject powders.

Figure 1B:
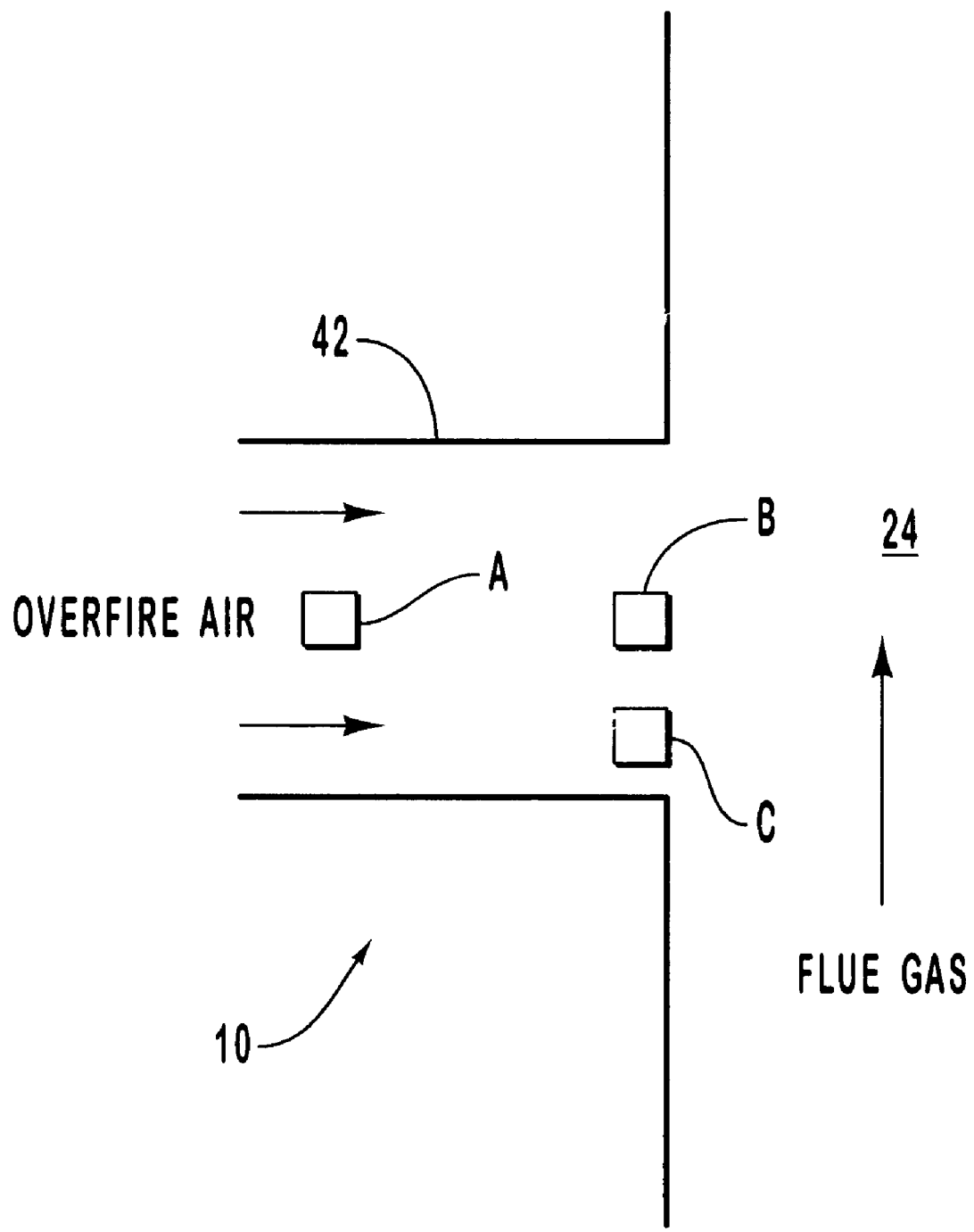
FIG. 1B is a schematic representation of a portion of the coal-fired combustion device shown in FIG. 1A.

FIG. 1B depicts a portion of combustion system 10 discussed above including an overfire air duct 42 that directs overfire air into burnout zone 24 which receives combustion flue gas. Various possible locations for the injection of the selective reducing agent in droplet or powder form are also shown. When an injector is positioned at location A for injection of a reducing agent into overfire air duct 42, the reducing agent is premixed with overfire air prior to injection into burnout zone 24. When an injector is positioned at location B adjacent to the opening into the furnace, the selective reducing agent is injected into the overfire air concurrently with injection of the overfire air into burnout zone 24. This results in mixing of the reducing agent and overfire air in burnout zone 24. If an injector is positioned at an intermediate location between locations A and B, both mixing processes can take place such that part of the reducing agent is partially premixed with the overfire air prior to injection, with the remaining reducing agent being injected along with the premixed reducing agent into burnout zone 24 for further mixing with the overfire air. It should be noted that the injectors can be located anywhere relative to the axis of overfire air duct 42, such as at location C shown in FIG. 1B.

The injection system utilized in the present invention should be capable of providing droplets or powdered particles with an average size that can be adjusted. Preferably, the initial average size distribution of the spray droplets is substantially monodisperse, i.e., having fewer than about 10% of the droplets with droplet sizes (i.e., diameter) less than about half the average droplet size, and fewer than about 10% of the droplets having a droplet size of greater than about 1.5 times the average droplet size. The average size of the droplets injected into the overfire air can be determined as described in the Examples below, by selecting droplet sizes that optimize the droplet evaporation time. Simply injecting a selective reducing agent without regard to droplet size effectively requires the overfire air ports to be located at the SNCR temperature window if any $NO_x$ reduction is to be achieved.

The present inventors have surprisingly found that by controlling droplet or particle size, and using the overfire air as a "shield" to increase droplet or particle lifetime, NH release occurs approximately in the conventional temperature window. This surprising and advantageous finding allows the overfire air to be located at higher temperatures (i.e., at locations optimal for the conventional reburn process) than would otherwise be possible. Preferably, the droplet or particle size is adjusted so that the average droplet or particle lifetime is greater than the overfire air mixing time with the combustion flue gas. In general, a suitable initial average size of the droplets or particles injected into the overfire air can range from about 50 μm to about 1000 μm in diameter, preferably from about 100 μm to about 500 μm, and more preferably from about 200 μm to about 400 μm. These preferred droplet or particle sizes are the sizes of the droplets or particles as injected, i.e., the size of the droplets before evaporation or the size of the particles before gasification. When the initial average size of the droplets or particles injected into the overfire air ranges from about 50 μm to about 1000 μm in diameter, the average droplet evaporation or particle gasification times resulting from these diameters is from about 0.1 s to about 5 s, more preferably from about 0.2 s to about 2 s.

It was found by the modeling described in the Examples hereafter, that a high efficiency $NO_x$ control can be achieved via OFA/N-agent injection if the CO concentration in flue gas entering the burnout zone is decreased. To reduce influence of CO on $NO_x$ reduction, the N-agent can be injected with a delay, or injection can be arranged in such a way that the release of the N-agent into the gas phase occurs over longer period of time. The latter can be done, for example, by injecting larger droplets of aqueous solution containing the N-agent. Because of the longer time required for larger droplets to evaporate and mix with flue gas, the N-agent will be delivered to the flue gas with some delay. Both approaches result in the N-agent entering the flue gas after air and flue gas are already mixed, and thus allow for most of the CO to be oxidized before the N-agent reacts with $NO_x$.

Other variations on the above-described methods will be readily apparent to those skilled in the art, and such variations are included within the scope of the present invention. For example, the N-agents can be injected with the OFA without previously injecting reburning fuel into the flue gas. Further, the N-agents can be injected with recirculated flue gas which can serve the same purpose as OFA. For example, recirculated flue gas enriched by oxygen or air can be injected along with the N-agents through the same or separate injectors.

The following examples are given to illustrate the methods and systems of the present invention, and are not intended to limit the scope of the invention.

EXAMPLES

In the Examples below, both experimental and theoretical (modeling) results are described.

1. Experimental Setup

Figure 2:
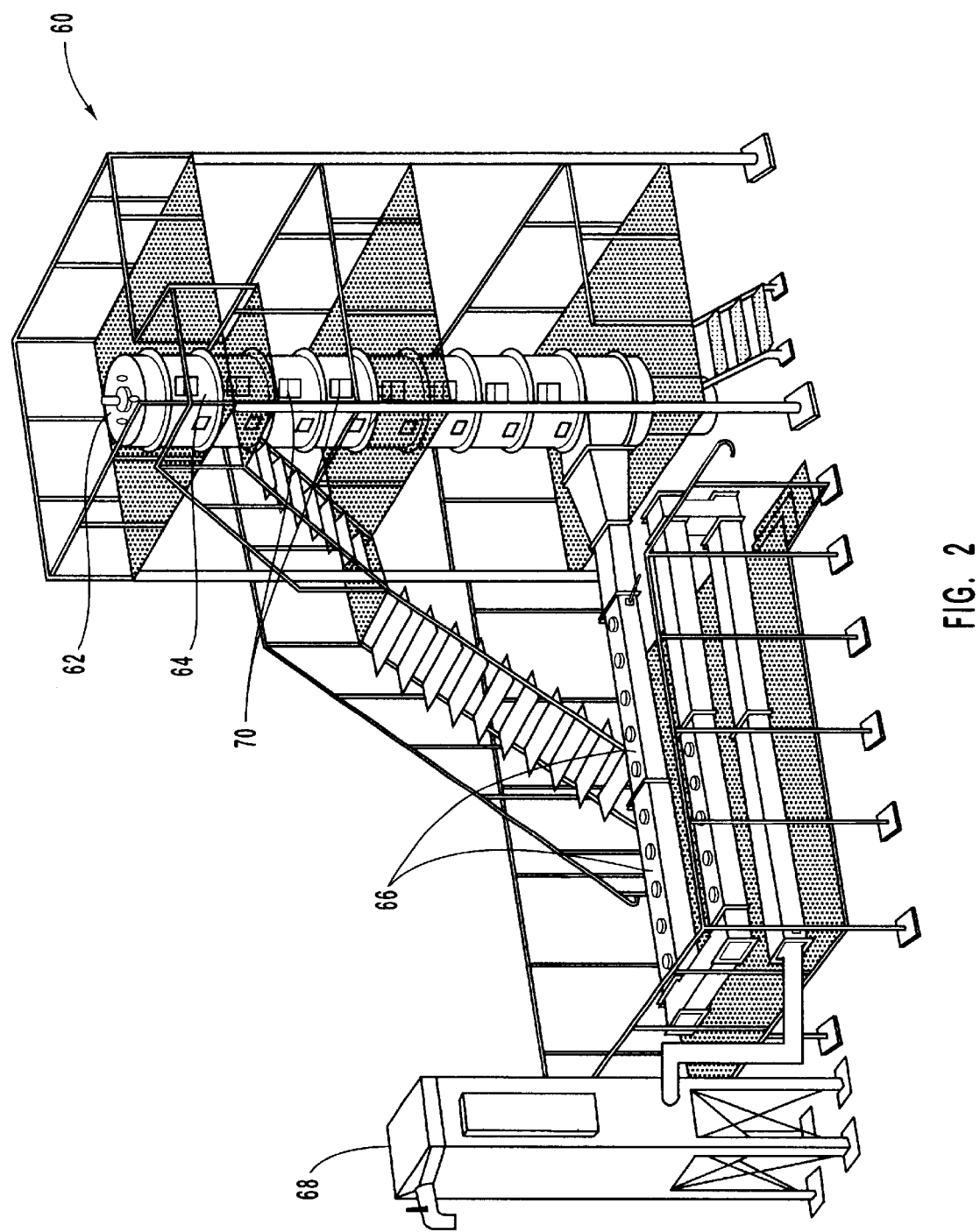
FIG. 2 shows a pilot-scale combustion facility used to demonstrate the methods of the present invention.

For the experimental results, pilot-scale tests were conducted in a 1.0 MMBTU/hr Boiler Simulator Facility (BSF). FIG. 2 is a schematic depiction of a BSF 60 designed to provide an accurate sub-scale simulation of the flue gas temperatures and compositions found in a full-scale boiler. The BSF 60 includes a burner 62, a vertically down-fired radiant furnace 64, a horizontal convective pass 66 extending from furnace 64, and a baghouse 68 in communication with convective pass 66. The burner 62 is a variable swirl diffusion burner with an axial fuel injector, and is used to simulate the approximate temperature and gas composition of a commercial burner in a full-scale boiler. Primary air is injected axially, while the secondary air stream is injected radially through the swirl vanes (not shown) to provide controlled fuel/air mixing. The swirl number can be controlled by adjusting the angle of the swirl vanes. Numerous access ports 70 located along the axis of the facility allow access for supplementary equipment such as reburn injectors, additive injectors, overfire air injectors, and sampling probes.

The radiant furnace 64 is constructed of eight modular refractory lined sections with an inside diameter of 22 inches and a total height of 20 feet. The convective pass 66 is also refractory lined, and contains air cooled tube bundles to simulate the superheater and reheater sections of a utility boiler. Heat extraction in radiant furnace 64 and convective pass 66 can be controlled such that the residence time-temperature profile matches that of a typical full-scale boiler. A suction pyrometer (not shown) is used to measure furnace gas temperatures.

A continuous emissions monitoring system (CEMS) was used for on-line flue gas analysis. The CEMS included a heated sample line, sample conditioning system (to remove moisture and particulates), and gas analyzers. Species analyzed included $O_2$, $N_x$, $CO$, $CO_2$, and $N_2O$.

2. Modeling

A state of the art process model was developed to optimize the injection of a particular N-agent, in this case urea, with the OFA stream as shown in FIG. 1. The process model included a detailed kinetic mechanism combined with gas dynamic parameters characterizing mixing of reagents. Process modeling helps to understand the effect of system components and conditions. In modeling, a set of chemical reactions representing the interaction of reactive combustion species and N-agents was assembled. Each reaction was assigned a certain rate constant and heat release or heat loss parameters. Numerical solution of differential equations for time-dependent concentrations of the reagents makes it possible to predict the concentration-time curves for all reacting species under selected process conditions. Using the modeling revealed the process conditions required for a strong improvement in $NO_x$ reduction. The following subsections describe model setup, and model validation via combustion experiments.

a. Model Setup

Mixing of reagents was described in the model by addition of flue gas to the stream of OFA (so-called inverse mixing). Injected gases were introduced to the reaction over a certain period of time (mixing time) rather than instantaneously.

Figure 3:
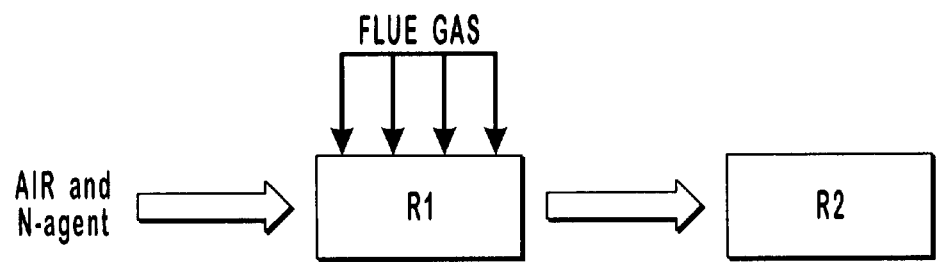
FIG. 3 is a schematic representation of a computer model used to predict and optimize process performance.

Referring now to the schematic illustration of FIG. 3, the process model treats the reacting system as a series of two plug-flow reactors R1 and R2. Each reactor describes one of the physical and chemical processes occurring in a boiler: addition of OFA and N-agent, and $NO_x$ reduction by N-agent and oxidation of partially oxidized products in the burnout zone. The first reactor R1 describes mixing of OFA and N-agent with flue gas using the model of inverse mixing. The mixture entering R1 consisted of air and the N-agent. It was assumed that the N-agent and OFA were premixed prior to injection. The flue gas was added to OFA at a constant rate over period of 120 ms. The flue gas added to R1 corresponds to products coming out of the reburning zone. The second reactor R2 describes reactions in the burnout zone.

Mixing time and temperature profile in the mixing region were estimated using a single jet in crossflow model ("JICFIS" model), as described in Cetegen et al., *Effective Mixing Processes for $SO_x$ Sorbent and Coal Combustion Products*, "U.S. Environmental Protection Agency Report No. EPA/600/7-87-013 (1987), the disclosure of which is incorporated by reference herein. Major inputs for the model included the velocity and density ratios of the crossflow to jet, their relative orientation in two dimensional rectangular coordinates, and the initial conditions (diameter, velocity, and temperature) of the jet. The mixing time is determined by evaluating the entrainment rate of fluid from the crossflow into the jet. The JICFIS model was used up to the point where the entering flow rate equals the main flow rate; after this point, complete mixing was assumed. At the point of complete mixing, the temperature of the jet is equal to that of the flue gas. For the OFA jet, the mixing time was calculated to be 110–120 ms. Variation of mixing time within the range of 120±120 ms showed little effect on modeling results. Based on the approximations in the JICFIS model, a mixing time of 120 ms was used for OFA injection.

b. Model Validation

The process model was validated based on experiments using co-injection of urea with OFA. The experimental data were obtained in the 300 kW Boiler Simulator Facility (BSF—FIG. 2).

The chemical kinetic code ODF (for "One Dimensional Flame") was employed to model experimental data. This is described in detail in Kau et al., *Fundamental Combustion Research Applied to Pollution Formation*, U.S. Environmental Protection Agency Report No. EPA/600/7-87-027, Volume 4: Engineering Analysis (1987), the disclosure of which is incorporated by reference herein. The ODF is designed to march through a series of well-stirred or plug flow reactors, solving a detailed chemical kinetics mechanism. The kinetic mechanism includes 447 reactions of 65 C—H—O—N chemical species as described in Glarborg et al., *Kinetic Modeling of Hydrocarbon/Nitric Oxide Interactions in a Flow Reactor*, Combust. Flame, 115, 1–27 (1998), the disclosure of which is incorporated by reference herein. The reburning fuel was injected into flue gas at 2500° F. The initial amount $[NO]_i$ of NO was 600 ppm. The temperature of flue gas decreased at a linear rate –550° F./s, approximately as in experiments. Variations in the temperature gradient within ±50° F. showed little effect on modeling predictions.

Example 1

Figure 4:
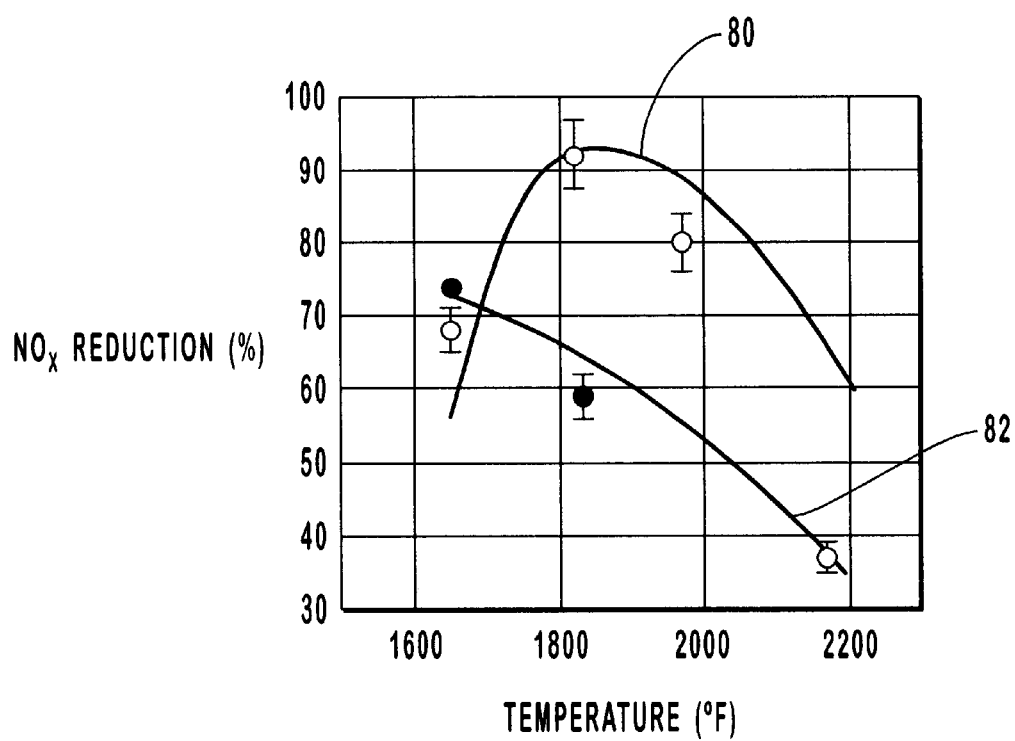
FIG. 4 is a graph showing predicted and observed effects of temperature on the methods of the present invention.

Urea was injected with overfire air at a concentration ratio of 1.5, the concentration ratio (hereinafter "NSR") being defined as the ratio of moles of atoms of nitrogen in the selective reducing agent to moles of atoms of nitrogen in the nitrogen oxide. FIG. 4 compares the observed experimental values for $NO_x$ reduction (open and filled circles) to modeled values, as a function of temperature, for two different reburning fuel input amounts. The open circles plot observed values for a 2% reburn fuel input, and curve 80 shows the corresponding modeling result. Similarly, the filled circles plot observed values for a 10% reburn fuel input, and curve 82 shows the corresponding modeling result. Rapid NO/urea mixing (i.e., small urea droplet size) was assumed.

The graph of FIG. 4 demonstrates that the computer model describes the main features of the inventive process. At small reburning fuel heat inputs (open circles, and curve 80), the dependence of the process efficiency on the OFA/N-agent injection temperature is similar to that observed in SNCR. Modeling well predicts the maximum efficiency for 2% reburning, and under predicts and over predicts efficiencies corresponding to temperatures lower than and higher than the optimum temperature, respectively. At 10% reburning (filled circles, and curve 82), the optimum process performance occurs at temperatures of 1500–1550° F. (temperatures too low for industrial applications).

Example 2

Figure 5:
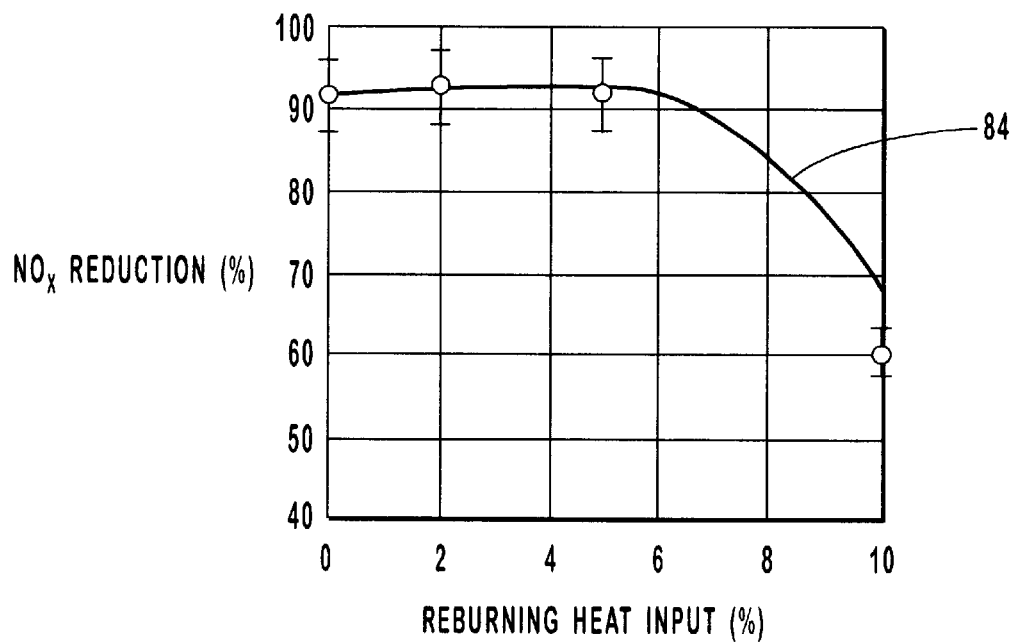
FIG. 5 is a graph showing predicted and observed effects of reburning heat input on the methods of the present invention.

The experimental and modeling experiments of Example 1 were repeated, this time holding the temperature fixed at 1800° F. and varying the reburning fuel input. The results are shown in the graph of FIG. 5. The circles on the graph show observed experimental results, and curve 84 shows the modeling prediction. The graph of FIG. 5 generally shows good agreement between modeling predictions and experimental data for injection of urea with the OFA at an OFA injection temperature of 1800° F. For less than 6% reburning fuel, the efficiency of $NO_x$ reduction is about 90–94%, and is insensitive to the amount of the reburning fuel. $NO_x$ reduction for these conditions is high due to rapid NO/N-agent mixing. As the amount of the reburning fuel increases, the efficiency of the process decreases.

Comparison of modeling predictions with experimental data for other conditions further confirmed that the process model gave a realistic description of experimental data. This confirmed that the mixing and kinetic sub-models adequately described these processes, and that the model could be used to study the effects of different parameters on trends in the process performance.

In Examples 3–5, the effect of droplet evaporation time on $NO_x$ reduction was modeled at different reburning fuel input amounts and different NSR values.

Example 3

Figure 6:
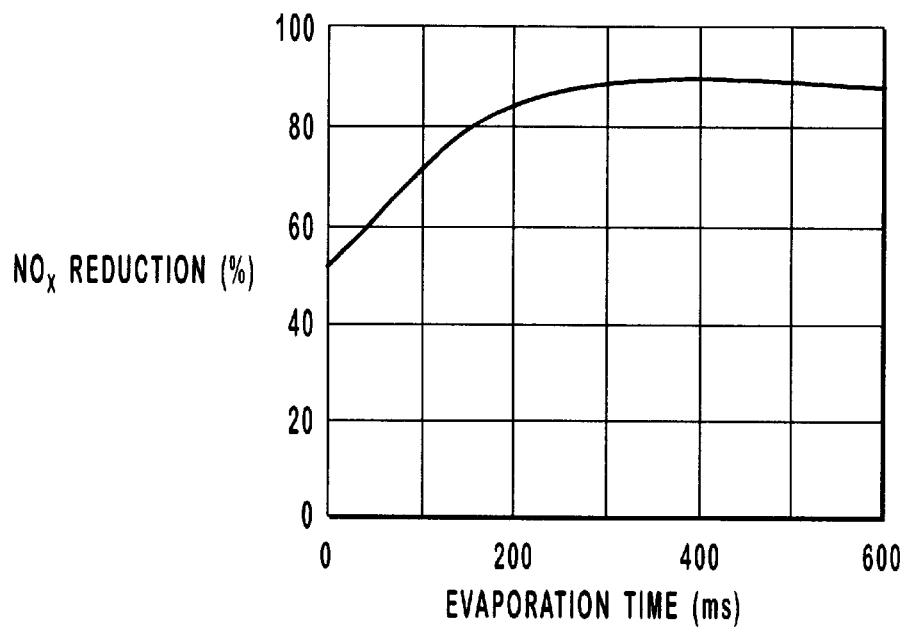
FIG. 6 is a graph showing the predicted effect of droplet evaporation time on $NO_x$ reduction by OFA/urea injection at a fixed temperature.

The graph of FIG. 6 shows the effect of droplet evaporation time on $NO_x$ reduction by urea at an OFA/urea injection temperature of 2200° F., for a 10% reburning fuel input and an NSR of 1.5. As the evaporation time increases, the efficiency of the process also increases. At longer evaporation times, corresponding to larger droplets, the dependence on evaporation time becomes less prominent, since at 2200° F. most CO is oxidized within the first 200 ms. Thus, longer droplet evaporation time (or larger droplet size) provides the best $NO_x$ reduction. This example illustrates the advantage of using a system in which the evaporation time or droplet size may be adjusted so as to provide the optimum $NO_x$ reduction.

Example 4

Figure 7:
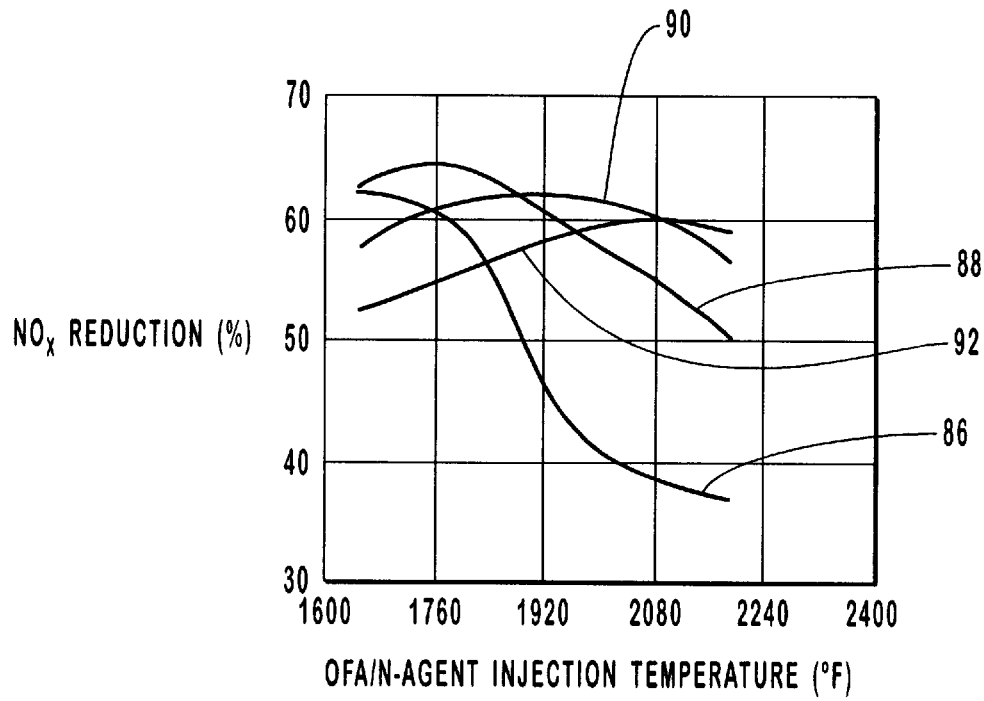
FIG. 7 is a graph showing the predicted effect of N-agent evaporation time on $NO_x$ reduction at 10% reburning as a function of OFA/N-agent injection temperature.

The graph of FIG. 7 shows the effects of droplet evaporation time on $NO_x$ reduction at several fixed evaporation times, as a function of the OFA/N-agent injection temperature, for a 10% reburning input and an NSR of 0.7. The curves 86, 88, 90 and 92 correspond to evaporation times of 0 ms (i.e., instantaneous), 200 ms, 400 ms, and 750 ms, respectively. At evaporation times smaller than the mixing time in the OFA zone, the maximum in $NO_x$ reduction occurs in the temperature range of about 1550–1650° F. In addition, as the evaporation time increases, the maximum reduction shifts toward higher temperatures, although amount of maximum $NO_x$ reduction slightly decreases.

Example 5

Figure 8:
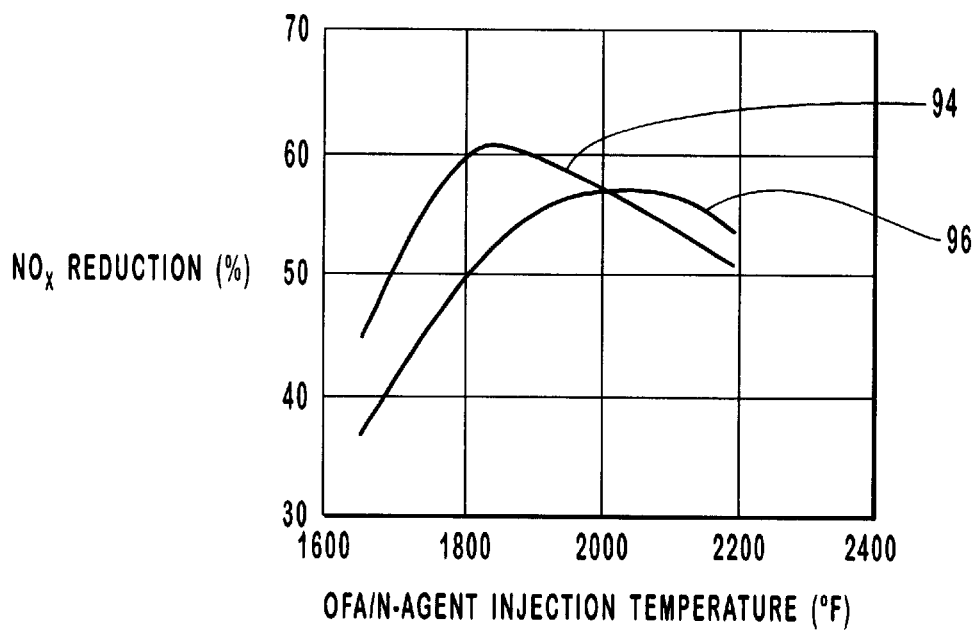
FIG. 8 is a graph showing the predicted effect of N-agent evaporation time on $NO_x$ reduction at 5% reburning as a function of OFA/N-agent injection temperature.

Example 5 repeats the modeling of Example 4, with a reducing fuel input of 5%, at evaporation times of 0 ms (curve 94) and 400 ms (curve 96), as shown in the graph of FIG. 8. Comparison of the graphs of FIGS. 7 and 8 demonstrates that by regulating the evaporation time of the N-agent, it is possible to achieve high levels of $NO_x$ reduction at large amounts of reburning fuel, at temperatures that can be utilized in large-scale combustion facilities. This approach can result in higher levels of $NO_x$ reduction, since larger amounts of the reburning fuel provide higher levels of $NO_x$ reduction before injection of the N-agent.

Thus, the modeling results suggest that utilization of droplets of larger size increases the efficiency of the process at larger heat inputs of the reburning fuel, and practically does not affect efficiency of the process at smaller heat inputs.

Example 6

Modeling predicts (and experiments confirm) that due to effective mixing, the efficiency of the SNCR process in BSF at 1800° F. and NSR=1.5 is very high (about 90% $NO_x$ reduction). It is not surprising that increasing the amount of reburning fuel up to 5% does not significantly improve $NO_x$ reduction. It is known, however, that in practical full-scale installations, the non-uniformity of the temperature profile, difficulties of mixing the N-Agent across the full boiler cross section, and limited residence time for reactions limit the effectiveness of SNCR to about 30–50%. The remaining N-agent simply passes through the system and appears as ammonia slip. Under such mixing conditions, the efficiency of an AR-Lean (advanced reburning fuel lean) process may depend more strongly on the amount of the reburning fuel. One way to simulate poor mixing of N-agent with flue gas is to reduce the amount of N-agent to the level that provides 40–50% $NO_x$ reduction, thus reflecting the N-agent available to react in real combustion systems. Thus, it is of practical interest to study AR-Lean processes for NSR smaller than 1.5.

Optimum conditions for $NO_x$ reduction at NSR=0.7 can occur at high injection temperatures if the evaporation time of the N-agent is increased. This will allow CO to be oxidized before the N-agent reaches the gas phase and reacts with $NO_x$. The increase in droplet evaporation time can be achieved, for example, by increasing the average droplet size of the N-agent, or by shielding the droplets with the flow of OFA.

Figure 9:
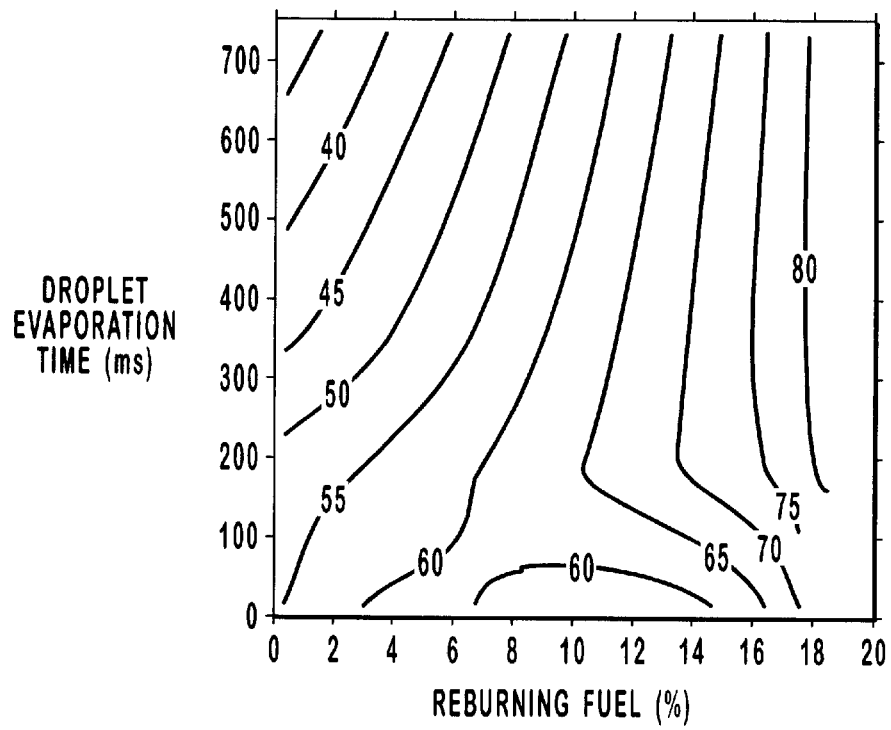
FIG. 9 is a graph showing the predicted $NO_x$ reduction performance as a function of the amount of reburning fuel and the evaporation time of the selective reducing agent.

The graph of FIG. 9 shows the predicted performance of the process as a function of the amount of the reburning fuel and evaporation time of N-agent. The N-agent injection temperatures are optimized for each amount of the reburning fuel to provide the highest level of $NO_x$ reduction. Optimum injection temperatures lie in the range of about 1800–2200° F. for these conditions. The graph of FIG. 9 predicts that a combination of 18% reburning and injection of N-agent results in about 80% $NO_x$ reduction when droplets of larger size are used, while 5% reburning provides no more than about 60% $NO_x$ reduction at any droplet size.

Figure 10:
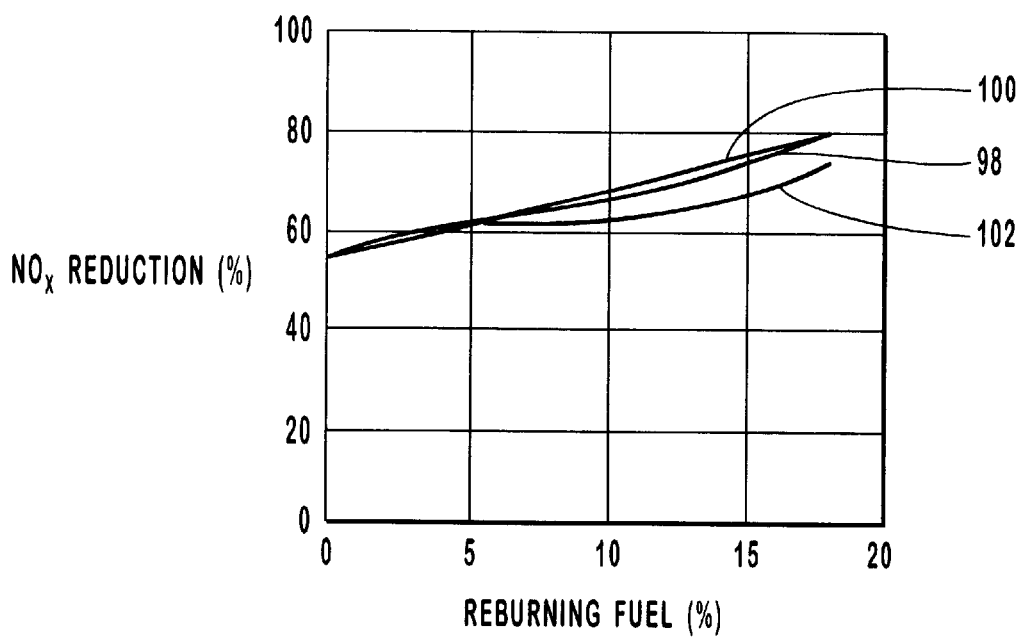
FIG. 10 is a graph comparing the $NO_x$ reduction performances of reburning plus OFA/N-agent injection, and reburning plus SNCR.

Injection of larger droplets of N-agent along with OFA places the N-agent deeper in the burnout zone and is similar to combining reburning with SNCR. Thus, performances of reburning with OFA/N-agent injection and reburning plus SNCR at optimum conditions should be similar. The graph of FIG. 10 compares predicted performances of reburning with OFA/urea injection (curve 98) and reburning plus SNCR (curve 100) at conditions (i.e., temperatures of flue gas at the point of N-agent injection and droplet evaporation times) that result in the highest level of $NO_x$ reduction. Thus, FIG. 10 demonstrates the best performances of the above technologies predicted by modeling. For comparison, FIG. 10 also shows OFA/urea injection performance for injection of smaller droplets of N-agent (non-optimized process, curve 102). It was assumed that in reburning plus SNCR, OFA is injected at 2200° F. FIG. 10 shows that by adjusting the temperature of N-agent injection and droplet evaporation time, the efficiency of reducing $NO_x$ emissions that can be achieved through the methods of the present invention is comparable to the efficiency of the conventional reburning plus SNCR method, without the need to install SNCR injectors.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A method of decreasing the concentration of nitrogen oxides in a combustion flue gas, comprising the steps of:
   (a) forming a combustion flue gas in a combustion zone, the combustion flue gas comprising nitrogen oxides;
   (b) providing overfire air and droplets of a solution or powdered particles of a selective reducing agent in a burnout zone, the droplets or particles having an average size such that the average droplet or particle lifetime is greater than the overfire air mixing time with the combustion flue gas; and
   (c) contacting the combustion flue gas with the overfire air and the selective reducing agent in the burnout zone to thereby decrease the concentration of lnitrogen oxides therein.

2. The method of claim 1, wherein the step of providing the overfire air and the selective reducing agent comprises forming a mixture of the overfire air and the droplets of a solution or powdered particles of the selective reducing agent.

3. The method of claim 1, wherein the step of providing the overfire air and the selective reducing agent comprises adding the selective reducing agent to the overfire air concurrently with injection of the overfire air into the burnout zone.

4. The method of claim 1, wherein the step of providing the overfire air and the selective reducing agent comprises adding the selective reducing agent to the overfire air prior to injection of the overfire air into the burnout zone.

5. The method of claim 1, wherein the selective reducing agent is selected from the group consisting of urea, ammonia, ammonium salts of organic acids, ammonium salts of inorganic acids, and mixtures thereof.

6. The method of claim 1, wherein the solution is an aqueous solution.

7. The method of claim 1, wherein the selective reducing agent is provided in a stoichiometric ratio of about 0.4 to about 10, the stoichiometric ratio being defined as the ratio of moles of atoms of nitrogen in the selective reducing agent to moles of atoms of nitrogen in the nitrogen oxides.

8. The method of claim 7, wherein the stoichiometric ratio is about 0.7 to about 3.

9. The method of claim 1, wherein the droplets or particles have an initial average size of about 50 $\mu$m to about 1000 $\mu$m.

10. The method of claim 1, wherein the droplets or particles have an initial average size of about 100 $\mu$m to about 500 $\mu$m.

11. The method of claim 1, wherein the droplets or particles have an initial average size of about 200 $\mu$m to about 400 $\mu$m.

12. The method of claim 1, wherein the droplets or particles have an average evaporation or gasification time of about 0.1 s to about 5 s.

13. The method of claim 1, wherein the droplets are formed to have an initial average size distribution with fewer than about 10% of the droplets having a droplet size less than about half the average droplet size, and fewer than about 10% of the droplets having a droplet size of greater than about 1.5 times the average droplet size.

14. The method of claim 2, wherein the mixture of overfire air and droplets of a solution or powdered particles of the selective reducing agent is formed by injecting the droplets or particles into the overfire air.

15. The method of claim 14, wherein the step of injecting the droplets or particles into the overfire air is carried out using an injection system which allows the average size of the droplets or particles to be adjusted.

16. The method of claim 1, wherein the concentration of the selective reducing agent in the solution is about 5% by weight to about 90% by weight.

17. A method of decreasing the concentration of nitrogen oxides in a combustion flue gas, comprising the steps of:
   (a) forming a combustion flue gas in a combustion zone, the combustion flue gas comprising nitrogen oxides;
   (b) providing overfire air and droplets of an aqueous solution or powdered particles of a selective reducing agent in a burnout zone, the droplets or particles having an initial average size of about 50 $\mu$m to about 1000 $\mu$m; and
   (c) contacting the combustion flue gas with the overfire air and the selective reducing agent in the burnout zone to thereby decrease the concentration of nitrogen oxides therein.

18. The method of claim 17, wherein the selective reducing agent is selected from the group consisting of urea, ammonia, ammonium salts of organic acids, ammonium salts of inorganic acids, and mixtures thereof.

19. The method of claim 17, wherein the step of providing the overfire air and the selective reducing agent comprises adding the selective reducing agent to the overfire air concurrently with injection of the overfire air into the burnout zone.

20. The method of claim 17, wherein the step of providing the overfire air and the selective reducing agent comprises adding the selective reducing agent to the overfire air prior to injection of the overfire air into the burnout zone.

21. The method of claim 17, wherein the selective reducing agent is provided in a stoichiometric ratio of about 0.4 to about 10, the stoichiometric ratio being defined as the ratio of moles of atoms of nitrogen in the selective reducing agent to moles of atoms of nitrogen in the nitrogen oxides.

22. The method of claim 17, wherein the droplets or particles have an average evaporation or gasification time of about 0.1 s to about 5 s.

23. The method of claim 17, wherein the droplets are formed to have an initial average size distribution with fewer than about 10% of the droplets having a droplet size less than about half the average droplet size, and fewer than about 10% of the droplets having a droplet size of greater than about 1.5 times the average droplet size.

24. The method of claim 17, wherein the droplets of solution or powdered particles of the selective reducing agent are provided by injecting the droplets or particles into the overfire air.

25. The method of claim 24, wherein the step of injecting the droplets or particles into the overfire air is carried out using an injection system which allows the average size of the droplets or particles to be adjusted.

26. The method of claim 17, wherein the concentration of the selective reducing agent in the solution is about 5% by weight to about 90% by weight.

27. A method of decreasing the concentration of nitrogen oxides in a combustion flue gas, comprising the steps of:
  (a) forming a combustion flue gas in a combustion zone, the combustion flue gas comprising nitrogen oxides;
  (b) injecting a reburn fuel into the combustion flue gas in a reburn zone downstream from the combustion zone and adapted to decrease the concentration of nitrogen oxides;
  (c) providing overfire air and droplets of an aqueous solution or powdered particles of a selective reducing agent in a burnout zone downstream from the reburn zone, the droplets or particles having an average size such that the average droplet or particle lifetime is greater than the overfire air mixing time with the combustion flue gas; and
  (d) contacting the combustion flue gas with the overfire air and the selective reducing agent in the burnout zone to thereby decrease the concentration of nitrogen oxides therein.

28. The method of claim 27, wherein the step of providing the overfire air and the selective reducing agent comprises adding the selective reducing agent to the overfire air concurrently with injection of the overfire air into the burnout zone.

29. The method of claim 27, wherein the step of providing the overfire air and the selective reducing agent comprises adding the selective reducing agent to the overfire air prior to injection of the overfire air into the burnout zone.

30. The method of claim 27, wherein the selective reducing agent is provided in a stoichiometric ratio of about 0.4 to about 10, the stoichiometric ratio being defined as the ratio of moles of atoms of nitrogen in the selective reducing agent to moles of atoms of nitrogen in the nitrogen oxides.

31. The method of claim 27, wherein the droplets or particles have an average evaporation or gasification time of about 0.1 s to about 5 s.

32. The method of claim 27, wherein the droplets are formed to have an initial average size distribution with fewer than about 10% of the droplets having a droplet size less 1 than about half the average droplet size, and fewer than about 10% of the droplets having a droplet size of greater than about 1.5 times the average droplet size.

33. The method of claim 27, wherein the droplets of solution or powdered particles of the selective reducing agent are provided by injecting the droplets or particles into the overfire air.

34. The method of claim 33, wherein the step of injecting the droplets or particles into the overfire air is carried out using an injection system which allows the average size of the droplets or particles to be adjusted.

35. The method of claim 27, wherein the concentration of the selective reducing agent in the solution is about 5% by weight to about 90% by weight.

* * * * *

UNITED STATES PATENT AND TRADEMARK OFFICE
CERTIFICATE OF CORRECTION

PATENT NO.    : 6,280,695 B1
DATED         : August 28, 2001
INVENTOR(S)   : Vitali V. Lissianski, Vladimir M. Zamansky, Richard K. Lyon and Roy Payne It is certified that error appears in the above-identified patent and that said Letters Patent is hereby corrected as shown below:

Column 9,
Line 21, after "$O_2$" change "$N_x$" to -- $NO_x$ --

Column 10,
Line 13, after "range of" change "120±120" to -- 120±20 --

Column 12,
Line 5, after "larger" change "beat" to -- heat --

Column 16,
Line 11, after "size less" delete "1"

Signed and Sealed this

Fourth Day of June, 2002

Attest:

JAMES E. ROGAN
Attesting Officer    Director of the United States Patent and Trademark Office